United States Patent [19]

Fava

[11] 4,315,841

[45] Feb. 16, 1982

[54] FILLED MOLDING COMPOSITION FEATURING STAR-BLOCK COPOLYMER CONJUGATED DIENE AND VINYL AROMATIC COMPOUND

[75] Inventor: Ronald A. Fava, Monroeville, Pa.

[73] Assignee: ARCO Polymers, Inc., Philadelphia, Pa.

[21] Appl. No.: 184,503

[22] Filed: Sep. 5, 1980

[51] Int. Cl.³ ............................................. C08K 9/04
[52] U.S. Cl. ............................. 260/23.7 M; 260/42.47
[58] Field of Search ............ 260/23.7 M, 42.14, 42.37, 260/42.47; 525/89, 98, 314

[56] References Cited

U.S. PATENT DOCUMENTS

| | | | |
|---|---|---|---|
| 3,325,430 | 6/1967 | Grasley | 525/98 |
| 3,562,355 | 2/1971 | Holden | 260/42.47 |
| 3,959,192 | 5/1976 | Delfosse | 260/42.47 |
| 3,987,002 | 10/1976 | Lakshmanan | 260/42.47 |
| 4,180,530 | 12/1979 | Bi | 525/98 |
| 4,216,131 | 8/1980 | Himes | 525/89 |
| 4,216,132 | 8/1980 | Zweig | 525/89 |

*Primary Examiner*—Paul R. Michl
*Attorney, Agent, or Firm*—John R. Ewbank

[57] ABSTRACT

A molding composition consists of an intimate mixture of:

(1) about 25 to about 40 percent calcium carbonate having an average particle size range of from about 450 to about 850 millimicrons and
(2) about 60 to about 75 percent star-block copolymer of:
  (a) about 60 to about 95 percent vinyl aromatic compound and
  (b) about 40 to about 5 percent conjugated diene, said star-block copolymer having from about 3 to about 20 arms, at least some of the arms comprising random segments substantially free from significant blocks of either monovinyl aromatic component or conjugated diene component.

1 Claim, No Drawings

FILLED MOLDING COMPOSITION FEATURING STAR-BLOCK COPOLYMER CONJUGATED DIENE AND VINYL AROMATIC COMPOUND

RELATED APPLICATIONS

Reference is made to commonly assigned U.S. Pat. No. 4,180,530 and to Ser. No. 35,047, filed May 1, 1979; Ser. No. 167,883, filed July 15, 1980, as a continuation of said Ser. No. 35,047; Ser. No. 38,150, filed May 11, 1979; and Ser. No. 38,611, filed May 14, 1979; all concerned with star-block copolymers of 60 to 95 percent monovinyl aromatic component and 40 to 5 percent conjugated diene component, all the teachings and disclosures of which are incorporated herein and deemed here reiterated.

FIELD OF INVENTION

Molding compositions comprising star-block copolymers, featuring 5 to 40 percent conjugated diene.

PRIOR ART

Molding compositions comprising 5 to 40 percent conjugated diene can have advantageous impact strengths, particularly when the copolymer is prepared as a star-block copolymer by an appropriate series of anionic polymerization stages using an organolithium material (e.g., sBuLi) as the catalyst.

Fillers such as calcium carbonate are employed in molding compositions, but the variations in performance have been so great as to make it impossible to predict the effect of significant variations in the concentration, particle size and/or other parameters affecting a calcium carbonate filler.

A demand has long existed for molding compositions having the density, fire retardancy and related advantages of filled plastics and having advantageous impact resistance, but prior technologists have failed to meet this demand using major amounts of inexpensive monomers such as styrene.

SUMMARY OF INVENTION

In accordance with the present invention, an advantageous molding composition consists of:
(1) about 25 to about 40 percent calcium carbonate having an average particle size range of from about 450 to about 850 millimicrons and
(2) about 60 to about 75 percent star-block copolymer of:
 (a) about 60 to about 95 percent vinyl aromatic compound and
 (b) about 40 to about 5 percent conjugated diene, said star-block copolymer having from about 3 to about 20 arms, at least some of the arms comprising random segments substantially free from significant blocks of either monovinyl aromatic component or conjugated diene component.

The invention is further clarified by reference to a plurality of examples.

EXAMPLES 1 and 2

A star-block interpolymer features a linking component at the core of the molecule, from which there are from about 3 to 20 arms extending like the points of a star or the tentacles of an octopus. An arm may be a linear homopolymer or a segmented chain having significant blocks of a particular polymer. The differences amongst star-block interpolymers are oftentimes attributable to variables such as the number of arms, the percentage of arms having appropriate positions in the segments, the percentages of each monomeric component and the percentage of appropriate components which are polymerized to provide arms having appropriate characteristics.

The star-block interpolymers of the present invention are prepared by the use of an organolithium catalyst for several successive stages of anionic polymerization. Each stage of anionic polymerization is conducted in the presence of an organic solvent such as cyclohexane. The earlier stages feature formation of each type of arm of star-block. A linking component, often formed in situ by the polymeric branching of an appropriate monomer such as divinylbenzene reacts with the lithium-containing polymers (precursors for arms of the star-block) to form an octopus or star-type structure having an appropriate average number of arms radiating from such linking nucleus.

The star-block polymers employed in the present invention feature from about 3 to about 20 arms, the star-block polymer having from about 60 to 95 percent by weight of a monovinyl aromatic compound (e.g., styrene) and 40 to 5 percent by weight of a conjugated diene of 4 to 8 carbons (e.g., butadiene) and in which at least some of the arms comprise random segments substantially free from significant blocks of either monovinyl aromatic compound or conjugated diene.

As explained in Bi et al U.S. Pat. No. 4,180,530 and related applications, the characteristics of star-block polymers resulting from several stages of anionic polymerization (i.e., using organolithium catalysis) and which have arms with major segments which are random copolymers of styrene and butadiene are significantly different from the characteristics of star-block copolymers lacking such random segments.

Pigment and filler distributors have significant knowledge about the properties of plastic compositions containing appropriate fillers. The impossibility of predicting the usefulness of filled plastics has prompted the practice of marketing a series of fillers and encouraging the buyer to make its own determination of suitability.

Calcium carbonate filler is marketed by one manufacturer in three particle sizes:

| Brand | Average Particle Size Range | Codesize |
|---|---|---|
| Hi-Pflex | 5,000 to 10,000 millimicrons | (7,500) |
| Super-Pflex | 450 to 850 millimicrons | (650) |
| Ultra-Pflex | 60 to 80 millimicrons | (70) |

In many applications, the smaller the particle size, the better the performance of the filled plastic, so that it is primarily the cost advantage that prompts usage of the particles of larger size as fillers for plastic.

Surprisingly, however, it was discovered that the optimum combination of properties was achieved using the calcium carbonate particles having an average size within the range from about 450 to 850 millimicron as a filler for the star-block copolymers featuring segments of random copolymer, as shown in Table I. Said Super-Pfex brand of calcium carbonate is prepared by controlling the precipitation to achieve the desired narrow range of particle sizes, so that most of the particles are within about 20% of the average particle size, and so that a stearic acid (and/or calcium stearate) coating enhances the compatability with molding resins. The literature relating to the control of particle size of precipitated calcium carbonate and stearic acid modified calcium carbonate describes several substantially equivalent methods for preparing stearic acid modified calcium carbonate having an average particle size within the range from about 450 to about 850 millimicrons. The size and surface characteristics of the calcium carbonate, as distinguished from the specific method of preparation, governs suitability for the compositions of the present invention.

TABLE I

CaCO3 Filled Star-Block Copolymer

| Control | Ex. | Resin | CaCO3 Filler (particle size millimicrons) 7500 | 650 | 7 | Vicat °F. | Flex Mod. ($10^3$ psi) | Izod (ft. lb./in.) | Gardner (in./lbs.) |
|---|---|---|---|---|---|---|---|---|---|
| A | | 100 | none | | | 195 | 180 | 0.3 | 70 |
| B | | 70 | 30 | | | 195 | 210 | 0.9 | 160 |
| C | | 65 | 35 | | | 193 | 230 | 1.1 | 170 |
| | 1 | 70 | | 30 | | 194 | 220 | 2.0 | 180 |
| | 2 | 65 | | 35 | | 196 | 240 | 2.3 | 190 |
| D | | 70 | | | 30 | 198 | 220 | 0.4 | 40 |
| E | | 65 | | | 35 | 198 | 220 | 0.4 | 50 |

Impact strength is measured by the combination of Izod and Gardner data and is superior for Examples 1 and 2 contrasted with controls B, C, D and E.

EXAMPLES 3 and 4

By a series of tests, it is established that the concentration of the 650 millimicron CaCO3 particles should be within the range from about 25 percent to about 40 percent, as indicated by the data in Table II.

TABLE II

| Control | Example | Resin/CaCo3 | Izod (ft.lb./inch) | Flexural Modulus ($10^3$ psi) |
|---|---|---|---|---|
| F | | 95/5 | 0.5 | 160 |
| G | | 90/10 | 0.5 | 170 |
| H | | 80/20 | 0.8 | 200 |
| | 3 | 75/25 | 0.8 | 210 |
| | 4 | 60/40 | 1.9 | 260 |
| J | | 50/50 | 0.8 | 330 |
| K | | 40/60 | 0.3 | 430 |
| L | | 30/70 | 0.3 | 570 |

It can be noted that there is more criticality just above the 40 percent than just below the 25 percent, and that the use of as little as 5 percent of the 650 millimicron CaCO3 enhanced the impact resistance of the samples produced from such molding composition.

It is oftentimes desirable to provide a small amount of a coating of an organic material such as stearic acid on the CaCO3 particles. There is reason to believe that Super-Pflex particles have such a stearic acid coating. The Super-Pflex brand of 700 millimicron CaCO3 filler is available from the Pfizer Company.

Various modifications of the invention are possible without departing from the scope of the claims.

The invention claimed is:

1. A molding composition having an advantageous impact strength, said molding composition consisting of an initate mixture of from about 25 to about 40 percent of precipitated calcium carbonate particles and about 75 to 60 percent star-block interpolymer of 60 to 95 percent by weight monovinyl aromatic compound and 40 to 5 percent by weight conjugated diene of from 4 to 8 carbon atoms, said star-block interpolymer having been prepared by polymerization using an organolithium catalyst, said star-block interpolymer having from about 3 to 20 arms, at least some of the arms comprising random segments substantially free from significant blocks of either monovinyl aromatic compound or conjugated diene, said precipitated calcium carbonate particles resulting from precipitation at conditions controlled to provide an average size within the range from about 450 to about 850 millimicrons and said particles being modified by a minor amount of coating derived from stearic acid.

* * * * *